(12) United States Patent
Ishitsuka

(10) Patent No.: US 9,160,872 B2
(45) Date of Patent: Oct. 13, 2015

(54) DISPLAY CONTROL APPARATUS AND DISPLAY CONTROL METHOD

(75) Inventor: Yuichiro Ishitsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 13/530,588

(22) Filed: Jun. 22, 2012

(65) Prior Publication Data

US 2013/0009983 A1   Jan. 10, 2013

(30) Foreign Application Priority Data

Jul. 8, 2011 (JP) .................................. 2011-152341

(51) Int. Cl.
*H04N 1/00* (2006.01)
*G06F 17/30* (2006.01)
*G06F 3/0482* (2013.01)
*G09G 5/00* (2006.01)
*H04N 101/00* (2006.01)

(52) U.S. Cl.
CPC .......... *H04N 1/00453* (2013.01); *G06F 3/0482* (2013.01); *G06F 17/30056* (2013.01); *G09G 5/00* (2013.01); *G09G 2340/045* (2013.01); *G09G 2340/14* (2013.01); *H04N 2101/00* (2013.01)

(58) Field of Classification Search
None
See application file for complete search history.

(56) References Cited

U.S. PATENT DOCUMENTS

| 7,532,771 B2* | 5/2009 | Taylor et al. | 382/284 |
| 8,446,422 B2 | 5/2013 | Tanaka et al. | |
| 8,478,347 B2 | 7/2013 | Kim et al. | |
| 2003/0076312 A1 | 4/2003 | Yokoyama | |
| 2005/0097475 A1* | 5/2005 | Makioka et al. | 715/792 |
| 2008/0079823 A1 | 4/2008 | Kojima | |
| 2008/0084415 A1* | 4/2008 | Gundel | 345/427 |
| 2009/0201314 A1 | 8/2009 | Tanaka et al. | |
| 2010/0146447 A1 | 6/2010 | Ubillos et al. | |
| 2010/0173678 A1 | 7/2010 | Kim et al. | |
| 2010/0287502 A1 | 11/2010 | Ito et al. | |
| 2011/0107228 A1* | 5/2011 | Huang | 715/739 |
| 2011/0145709 A1* | 6/2011 | Yoo et al. | 715/730 |

FOREIGN PATENT DOCUMENTS

| CN | 1414786 A | 4/2003 |
| CN | 101510978 A | 8/2009 |
| CN | 101794203 A | 8/2010 |
| EP | 2 271 078 A3 | 1/2011 |
| JP | 2005-091430 A | 4/2005 |
| JP | 2007-172344 A | 7/2007 |
| KR | 10-2010-0063892 A | 6/2010 |

OTHER PUBLICATIONS

German Office Action dated Apr. 22, 2013, in related German Patent Application No. 102012211806.3.

(Continued)

*Primary Examiner* — Xiao Wu
*Assistant Examiner* — Steven Elbinger
(74) *Attorney, Agent, or Firm* — Fitzpatrick, Cella, Harper & Scinto

(57) ABSTRACT

A display control apparatus comprises a display control unit configured to display an image in each of a plurality of areas within a display screen, and a notifying unit configured to, when identical images are displayed in the plurality of areas, give a notification which indicates that the images are identical and not to give the notification when different images are displayed in the plurality of areas.

14 Claims, 9 Drawing Sheets

(56) References Cited

OTHER PUBLICATIONS

"Image Comparer: Searching and Deleting Similar Photos", Tom's Hardware Guide, Dec. 15, 2007, pp. 1-5.

Nov. 7, 2013 Russian Official Action in Russian Patent Application No. 2012126063.

Oct. 31, 2014 Chinese Official Action in Chinese Patent Appln. No. 201210237610.4.

\* cited by examiner

DISPLAY CONTROL APPARATUS AND DISPLAY CONTROL METHOD

BACKGROUND OF THE INVENTION

1. Field of the Invention

The present invention relates to a display control apparatus and display control method which can display an image in each of a plurality of areas within the same display screen.

2. Description of the Related Art

Conventionally, in a display control apparatus capable of displaying an image in each of a plurality of areas within the same display screen, an operation is improved for selecting an image to be displayed in each area. Japanese Patent Laid-Open No. 2005-091430, for example, discloses a technique of providing two image display areas in order to compare two images and two thumbnail image display areas for selecting one of the two images, thereby comparing these images and selecting one of them.

However, in the above-mentioned technique disclosed in Japanese Patent Laid-Open No. 2005-091430, even if images in the same file are displayed in a plurality of areas within the same display screen, the user may not be able to identify as such. As a result, an erroneous process which is not intended by the user may be executed for this image.

SUMMARY OF THE INVENTION

The present invention has been made in consideration of the aforementioned problems, and realizes a technique which notifies the user that images displayed in a plurality of areas within the same display screen are identical, thereby allowing the user to reliably identify as such.

To solve the aforementioned problems, the present invention provides a display control apparatus comprising: a display control unit arranged to display an image in each of a plurality of areas within a display screen; and a notifying unit arranged to provide a notification which indicates that the images in two or more of the plurality of areas are identical, when identical images are displayed in two or more of the plurality of areas, and not to provide the notification when different images are displayed in each of the plurality of areas.

To solve the aforementioned problems, the present invention provides a display control method comprising: a display control step of displaying an image in each of a plurality of areas within a display screen; and a notifying step of, when identical images are displayed in the plurality of areas, providing a notification which indicates that the images in two or more of the plurality of areas are identical and not providing the notification when different images are displayed in each of the plurality of areas.

According to the present invention, the user is notified that images displayed in a plurality of areas within the same display screen are identical, thereby allowing the user to reliably identify as such. This makes it possible to prevent execution of an erroneous process which is not intended by the user.

Further features of the present invention will become apparent from the following description of exemplary embodiments with reference to the attached drawings.

DESCRIPTION OF THE EMBODIMENTS

Embodiments of the present invention will be described in detail below.

<Apparatus Configuration>

The function and outer appearance of an image capturing apparatus 100 (a lens-interchangeable single-lens reflex digital camera will be exemplified in an embodiment) according to the embodiment of the present invention will be described with reference to FIGS. 1, 2A, and 2B.

Figure 1:
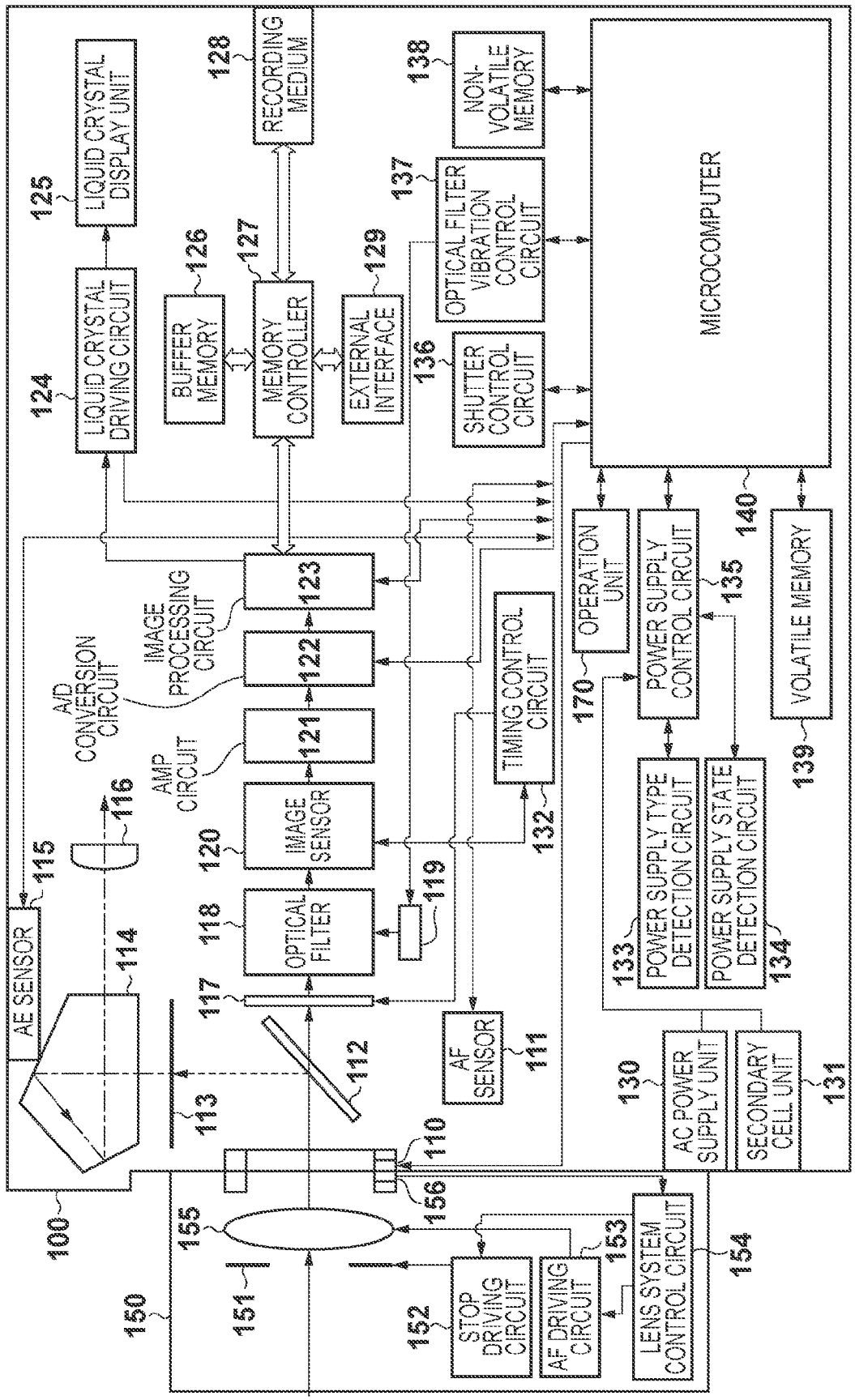
FIG. 1 is a block diagram showing the configuration of an image capturing apparatus according to an embodiment of the present invention.

Referring to FIG. 1, a lens unit 150 incorporates an interchangeable shooting lens 155. The shooting lens 155 generally includes a plurality of lenses but is simply shown as one lens for descriptive convenience. A communication terminal 156 is used by the lens unit 150 to communicate with the image capturing apparatus 100, and a communication terminal 110 is used by the image capturing apparatus 100 to communicate with the lens unit 150. The lens unit 150 communicates with a microcomputer 140 via the communication terminals 156 and 110 to cause an internal lens system control circuit 154 to control an aperture stop 151 through an aperture stop driving circuit 152. Furthermore, the lens unit 150 communicates with the microcomputer 140 via the communication terminals 156 and 110 to move the position of the shooting lens 155 through an AF driving circuit 153 to an in-focus position.

An AE sensor 115 measures the luminance of an object through the lens unit 150.

An AF sensor 111 outputs a defocus amount to the microcomputer 140. The microcomputer 140 controls the lens unit 150 based on the defocus amount.

The microcomputer 140 instructs, in exposure, to turn up/down a quick return mirror 112 by an actuator (not shown).

The user can check the focus and composition of an optical object image which has been obtained through the lens unit 150 by observing a focusing screen 113 through a pentaprism 114 and a finder 116.

A focal plane shutter 117 can freely control the exposure time of an image sensor 120 under the control of the microcomputer 140.

An optical filter 118 generally includes a low-pass filter, which cuts a high-frequency component of light incident from the focal-plane shutter 117 to guide an object image to the image sensor 120.

The image sensor 120 is generally, for example, a CCD or CMOS sensor, which photoelectrically converts an optical image formed on the image sensor 120 through the lens unit 150, and captures the image as an electric signal.

An AMP circuit 121 amplifies the captured electric signal with a gain corresponding to set shooting sensitivity.

An A/D conversion circuit 122 converts, into a digital signal, an analog signal converted into the electric signal by the image sensor 120.

An image processing circuit 123 executes filter processing, color conversion processing, and gamma/knee processing for the image data converted into the digital signal by the A/D conversion circuit 122, and outputs the obtained data to a memory controller 127. Furthermore, the image processing circuit 123 incorporates a D/A conversion circuit (not shown). The image processing circuit 123 can also convert, into an analog signal, the image data converted into the digital signal by the A/D conversion circuit 122 or the image data input by the memory controller 127, and output the obtained analog signal to a liquid crystal display unit 125 via a liquid crystal driving circuit 124. The microcomputer 140 can switch between the image processing and the display processing which are executed by the image processing circuit 123. The microcomputer 140 also performs white balance adjustment based on the color balance information of the shot image.

The liquid crystal display unit 125 is a back monitor for displaying an image. The monitor is not limited to a liquid crystal display and any display which displays an image such as an organic EL display may be used.

The memory controller 127, for example, stores unprocessed image data input from the image processing circuit 123 in a buffer memory 126, and stores image data having undergone image processing in a recording medium 128. Furthermore, the memory controller 127 fetches image data from the buffer memory 126 or recording medium 128, and outputs it to the image processing circuit 123. The memory controller 127 can also store, in the recording medium 128, image data transmitted via an external interface 129, and output image data stored in the recording medium 128 to an external apparatus via the external interface 129. Examples of the external interface are USB, IEEE, and HDMI interfaces.

The recording medium 128 is detachable from the image capturing apparatus 100 such as a semiconductor memory card. Note that the recording medium 128 may be an internal memory. The microcomputer 140 causes a timing control circuit 132 to control the timing of driving the image sensor 120.

A power supply control circuit 135 controls a power supply to be supplied with a power from an AC power supply unit 130 or secondary battery unit 131. In response to a control instruction from the microcomputer 140, the power supply control circuit 135 turns on/off the power supply. Furthermore, the power supply control circuit 135 notifies the microcomputer 140 of information about the current power supply state detected by a power supply state detection circuit 134 and information about the current power supply type detected by a power supply type detection circuit 133.

The microcomputer 140 causes a shutter control circuit 136 to control the focal-plane shutter 117.

An optical filter vibration control circuit 137 vibrates a piezoelectric element 119 connected to the optical filter 118 with predetermined vibration (a predetermined amplitude, vibration time, and vibration axis direction) according to a control instruction from the microcomputer 140.

A non-volatile memory 138 is a non-volatile recording medium such as an EEPROM, which can save setting values such as a shutter speed, aperture value, and shooting sensitivity that have been arbitrarily set by the user, and other various kinds of data even if the image capturing apparatus 100 is not powered on.

A volatile memory 139 stores data to be temporarily stored, such as the internal state of the apparatus and the information of the detachable recording medium 128.

An operation unit 170 includes various operation members as an input unit for accepting a user operation. As shown in FIGS. 2A and 2B, the operation unit 170 includes at least a release button 201, a main electronic dial 202, a sub electronic dial 203, a power switch 204, two-image display button 205, zoom/apply button 206, delete button 207, zoom button 208, reproduction button 209, single/multi-switch button 210, multi-controller 211, and SET button 212.

The microcomputer 140 serves as a control unit for controlling each component included in the image capturing apparatus 100. The microcomputer 140 maps a program recorded in the non-volatile memory 138 on the work area of the non-volatile memory such as a RAM, and executes the program to perform various processes of a flowchart (to be described later).

Figure 2A:
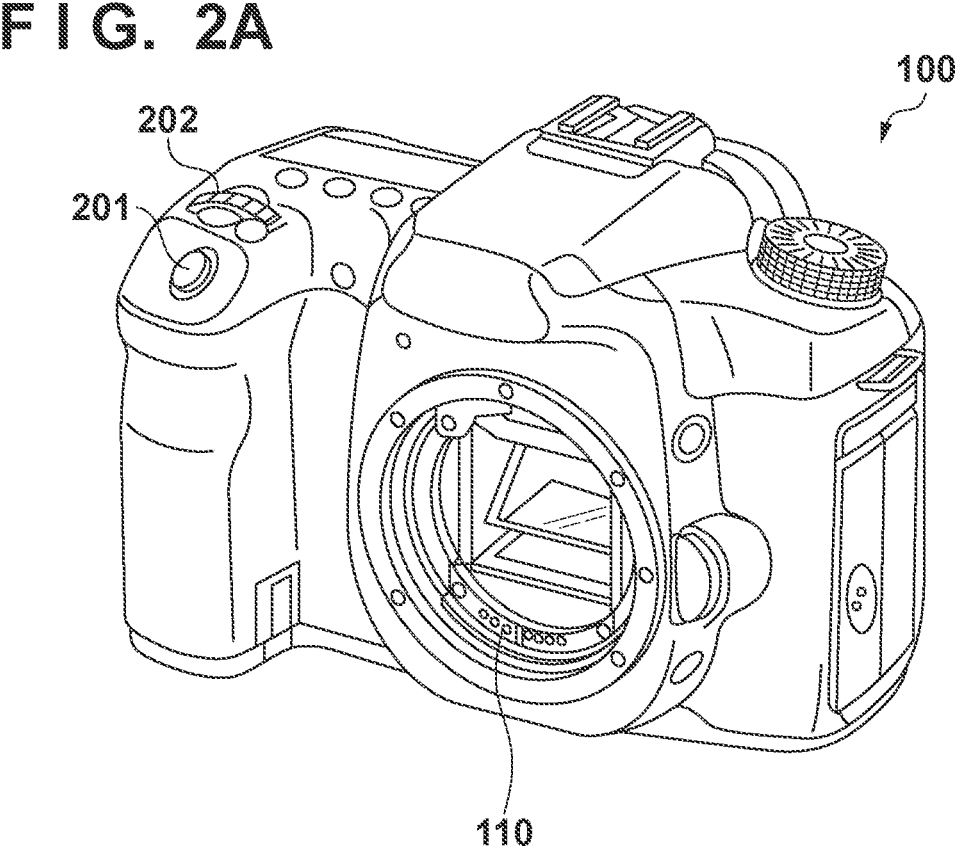
FIG. 2A is a view showing the outer appearance of the image capturing apparatus according to the embodiment when seen from the front side.
Figure 2B:
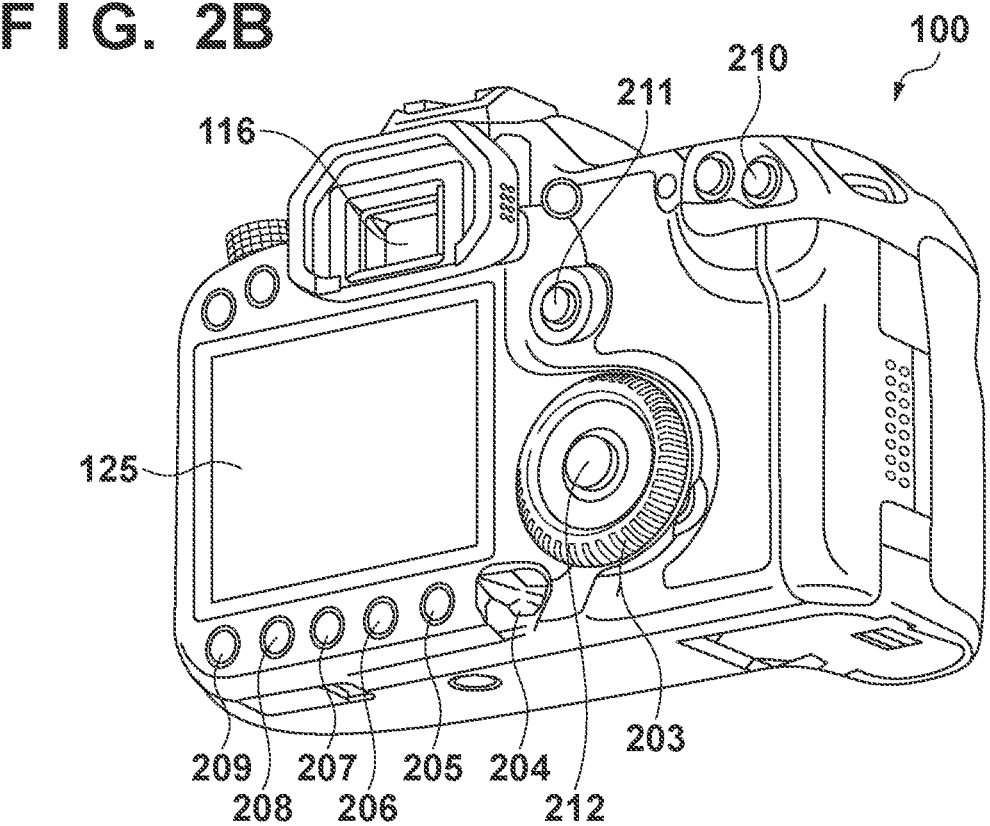
FIG. 2B is a view showing the outer appearance of the image capturing apparatus according to the embodiment when seen from the back side.

FIG. 2A is a view showing the outer appearance of the image capturing apparatus 100 when seen from the front side. FIG. 2B is a view showing the outer appearance of the image capturing apparatus when seen from the back side. The same reference numerals denote the same parts as those in FIG. 1.

The release button 201 serves as an operation unit for providing a shooting preparation instruction and a shooting instruction. When the user presses this button halfway, the microcomputer 140 is notified of a shooting preparation instruction to measure the luminance of an object and to perform focusing. When the user fully presses this button, the microcomputer 140 is notified of a shooting operation instruction and the shutter is released to shoot an image.

The main electronic dial 202 is a turning operation member. The user turns the main electronic dial 202 to set setting values such as a shutter speed and aperture value or to perform fine adjustment of a zoom magnification in a zoom mode.

The sub electronic dial 203 is a turning operation member. The user turns the sub electronic dial 203 to set setting values such as an aperture value and exposure correction or to perform an operation of forwarding one frame in an image display state.

The power switch 204 is an operation member for turning on or off the power supply.

The two-image display button 205 is an operation member for switching whether a reproduced image is to be displayed in a mode (to be referred to as a two-image display mode hereinafter) in which a two-image display process is performed.

The zoom/apply button 206 is an operation member for instructing to apply the zoom magnification and zoom position of an image displayed in the currently selected area in a two-image display mode (to be described later) to an image displayed in the other area as well.

The delete button 207 is a button which instructs to delete an image stored on the recording medium 128 built into or mounted on the image capturing apparatus 100.

The zoom button 208 is a button which accepts an operation of instructing to make a shift to the zoom mode (instructing to start the zoom mode) and instructing to cancel the zoom mode (instructing to end the zoom mode).

The reproduction button 209 is a button which displays on the liquid crystal display unit 125 an image stored on the recording medium 128 built into or mounted on the image capturing apparatus 100.

The single/multi-switch button 210 is a button which instructs to switch whether the measured luminance of the object is to be locked or whether single-display or multi-display is to be selected in a reproduced state.

The multi-controller 211 is an operation member which can be operated in a plurality of directions to set an autofocus start point, that is, a distance measurement point or move a zoom frame (zoom range) in a state in which a zoomed image is displayed.

The SET button 212 is an operation member for instructing to determine an item selected by a displayed selection frame (cursor) via, for example, a menu display screen.

<Display Example>

A mode of displaying an image on the liquid crystal display unit 125 in a two-image display mode will be described with reference to FIGS. 3A to 3H.

Figure 3A:
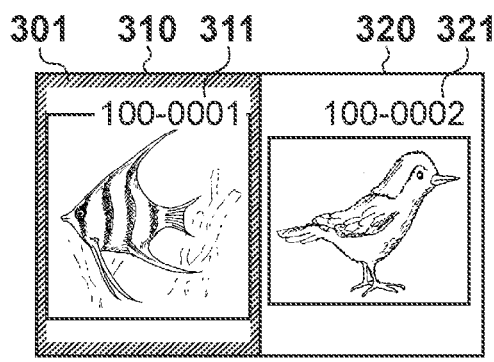
FIGS. 3A, 3B, 3C, 3D, 3E, 3F, 3G, and 3H are views illustrating image display modes in a two-image display process of the embodiment.
Figure 3E:
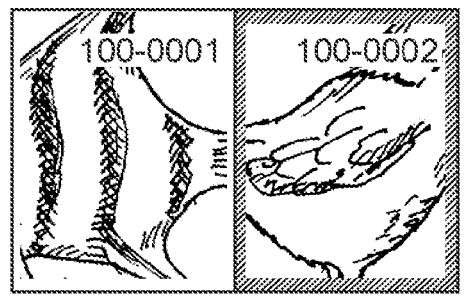
Figure 3B:
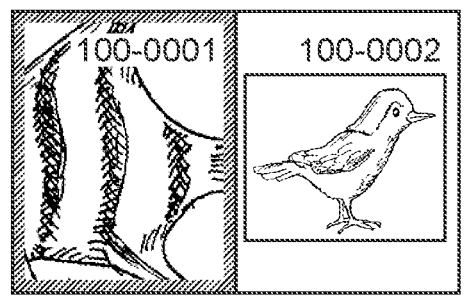

As shown in FIG. 3A, in the two-image display mode, the display area on the liquid crystal display unit 125 is divided into a left area 310 and a right area 320, and one image is displayed in each area. The file names (numbers 311 and 321) of images displayed in the left area 310 and right area 320, respectively, are displayed in the respective areas. Image forward scrolling and zoom display can be independently performed in the left area 310 and right area 320. That is, when one of the left area 310 and right area 320 is selected using a selection frame 301, and an image forward scrolling operation is performed, image forward scrolling is done in the area selected by the selection frame 301, so the displayed image is switched. At this time, the image in the other area that is not surrounded by the selection frame 301 remains unchanged. Also, when one of the left area 310 and right area 320 is selected using the selection frame 301, and a zoom operation is performed, the image in the area selected by the selection frame 301 undergoes zoom display. At this time, the zoom magnification of the image in the other area that is not surrounded by the selection frame 301 remains unchanged.

<Operation Explanation>

A reproduction mode process by the image capturing apparatus according to this embodiment will be described with reference to FIG. 4. Note that the microcomputer 140 expands a program recorded in the nonvolatile memory 138 into the volatile memory 139 as a work memory, and executes it, thereby implementing the following process.

As the reproduction button 209 is operated while the power supply of the image capturing apparatus 100 is ON, the image capturing apparatus 100 starts a reproduction mode process.

Figure 4:
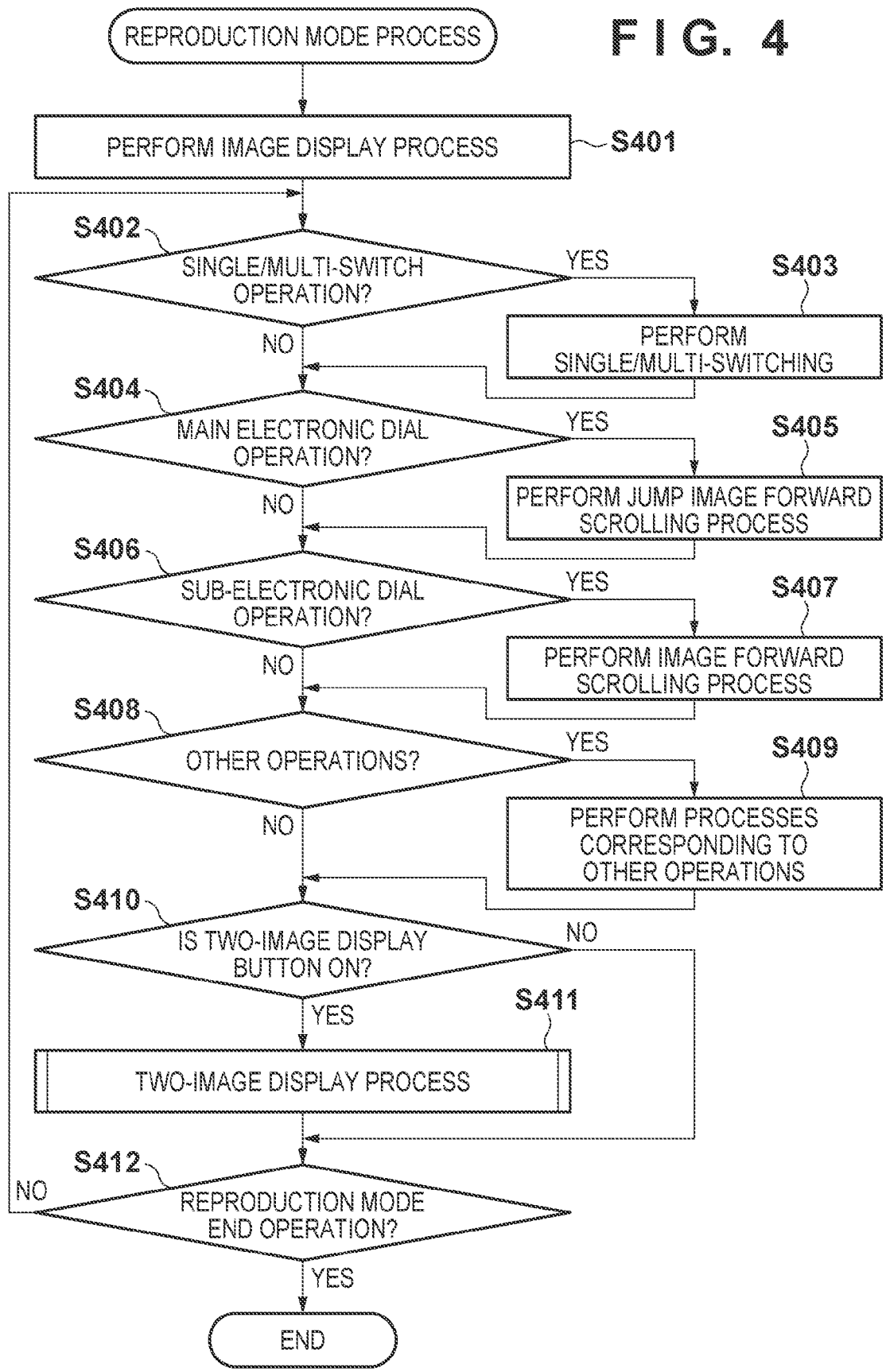
FIG. 4 is a flowchart showing a reproduction mode process in the embodiment.

Referring to FIG. 4, in step S401, the microcomputer 140 uses the image processing circuit 123 to process an image read from the buffer memory 126 or recording medium 128 via the memory controller 127, and displays it on the liquid crystal display unit 125 via the liquid crystal driving circuit 124.

In step S402, the microcomputer 140 determines whether the single/multi-switch button 210 is operated. If Yes is determined in step S402, the process advances to step S403; otherwise, the process directly advances to step S404.

In step S403, the microcomputer 140 switches between single-display (display on the entire display screen) and multi-display, in response to the operation of the single/multi-switch button 210. For example, multi-display is performed if single-display (display on the entire display screen) has been performed before the determination in step S402, or the display state is switched to single-display if multi-display has been performed before the determination in step S402. Also, the information of the display state after the switching (information as to whether single-display or multi-display is being done) is recorded in the volatile memory 139. During display of the entire display screen by single-display, an image is displayed at the larger one of a size obtained by matching the vertical size of the image with that of the display area on the liquid crystal display unit 125, and a size obtained by matching the horizontal size of the image with that of the display area on the liquid crystal display unit 125. That is, an image is displayed at a maximum size at which the entire image falls within the display area on the liquid crystal display unit 125. This magnification will be referred to as unit magnification hereinafter.

In step S404, the microcomputer 140 determines whether the main electronic dial 202 is operated. If Yes is determined in step S404, the process advances to step S405; otherwise, the process directly advances to step S406.

In step S405, the microcomputer 140 performs jump image forward scrolling. The jump image forward scrolling means a process of displaying an image subsequent to a predetermined number of images jumped from the current image in the sorting order of images to undergo image forward scrolling (for example, the order of file numbers) in accordance with the rotation amount corresponding to one click of the main electronic dial 202. In jump image forward scrolling, images between the current image and the image subsequent to the predetermined number of images jumped from the current image are skipped and not displayed. The current image means hereinafter an image currently displayed on the liquid crystal display unit 125 in single-display, or an image currently selected by, for example, a selection frame among a plurality of images displayed on the liquid crystal display unit 125 in multi-display. The number of jumped images is set in advance to a number selected from numbers such as 10 and 100 by the user. The case wherein, for example, 50 images having file numbers 0001 to 0050 are recorded on the recording medium 128 with no missing image, and the number of jumped images is set to 10 will be considered. In this case, if the main electronic dial 202 is rotated clockwise through an angle corresponding to one click while the current image has file number 0031, an image having file number 0041 is displayed. On the other hand, if the main electronic dial 202 is rotated counterclockwise through an angle corresponding to one click, an image having file number 0021 is displayed.

In step S406, the microcomputer 140 determines whether the sub-electronic dial 203 is operated. If Yes is determined in step S406, the process advances to step S407; otherwise, the process directly advances to step S408.

In step S407, the microcomputer 140 performs single-image forward scrolling corresponding to the direction in which the sub-electronic dial 203 is rotated by the operation in step S406. That is, if the sub-electronic dial 203 is rotated counterclockwise through an angle corresponding to one click, the microcomputer 140 reads an image next to the current image in the image forward scrolling order (for example, the order of file numbers) from the recording medium 128 via the memory controller 127, and displays it on the liquid crystal display unit 125. If the sub-electronic dial 203 is rotated clockwise through an angle corresponding to one click, the microcomputer 140 reads an image subsequent to the current image in the image forward scrolling order from the recording medium 128 via the memory controller 127, and displays it on the liquid crystal display unit 125.

In step S408, the microcomputer 140 determines whether other operations for images, such as the operation of the delete button 207 or that of the two-image display button 205, are performed. If Yes is determined in step S408, the process advances to step S409; otherwise, the process directly advances to step S410.

In step S409, the microcomputer 140 performs processes corresponding to the other operations. For example, if the delete button 207 is operated, the microcomputer 140 gives a process of deleting the current image from the recording medium 128. If a protect button (not shown) is operated, the microcomputer 140 gives a process of adding or deleting attribute information such as protection or rating to or from the current image.

In step S410, the microcomputer 140 determines whether the two-image display button 205 is operated. If Yes is determined in step S410, the process advances to step S411, in which the microcomputer 140 sets a two-image display mode to perform a two-image display process. The two-image display process will be described in more detail with reference to FIG. 5. If No is determined in step S410, the process directly advances to step S412.

In step S412, the microcomputer 140 determines whether a reproduction mode end operation, such as turnoff of the power supply via the power switch 204 or the operation of the release button 201, is performed. If No is determined in step S412, the process returns to step S402; otherwise, the process ends.

<Two-image Display Process>

The two-image display process in step S411 of FIG. 4 will be described with reference to FIGS. 5 to 7. Note that the microcomputer 140 expands a program recorded in the nonvolatile memory 138 into the volatile memory 139 as a work memory, and executes it, thereby implementing the following process.

Figure 5:
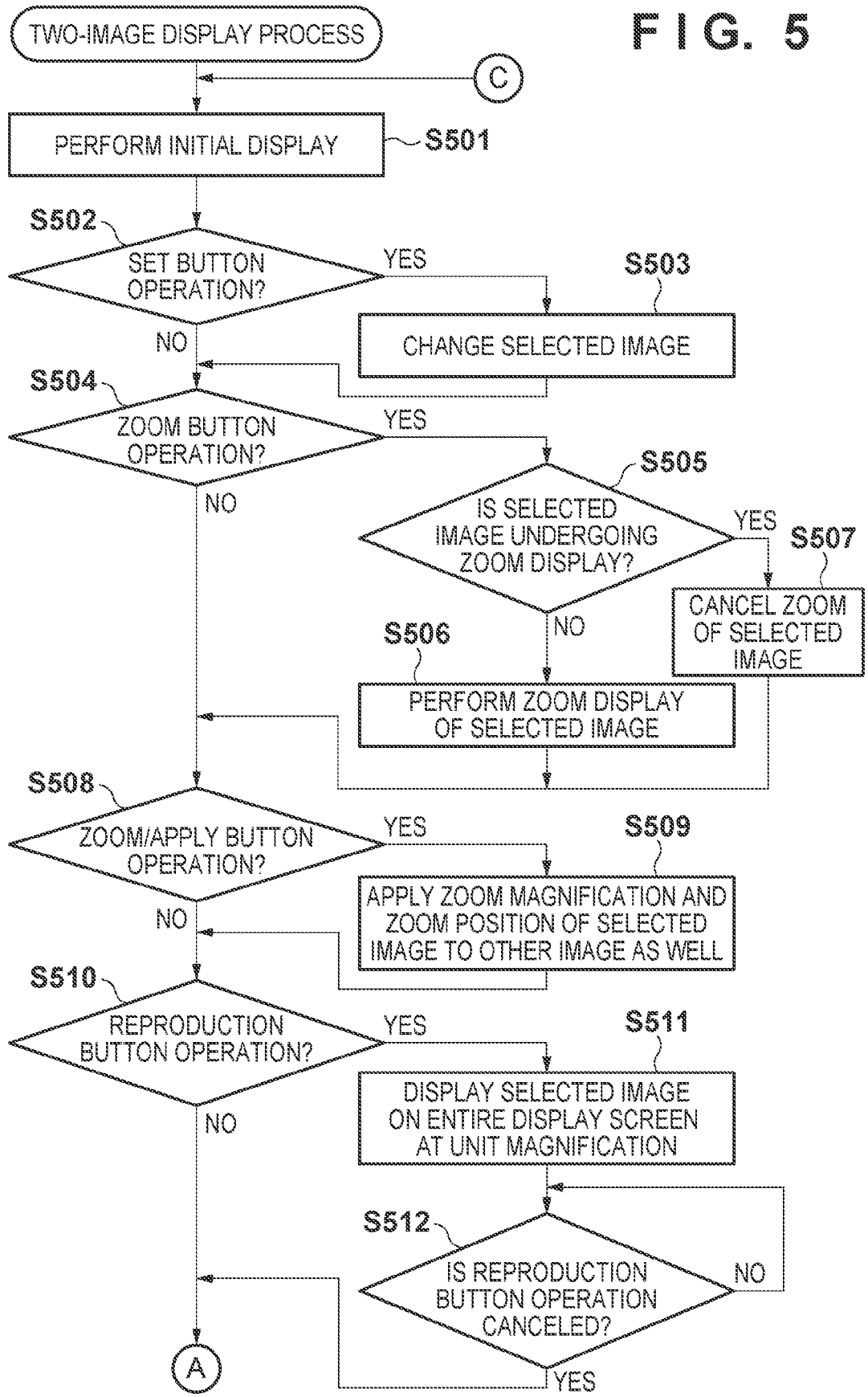
FIG. 5 is a flowchart showing a two-image display process in step S411 of FIG. 4.
Figure 6:
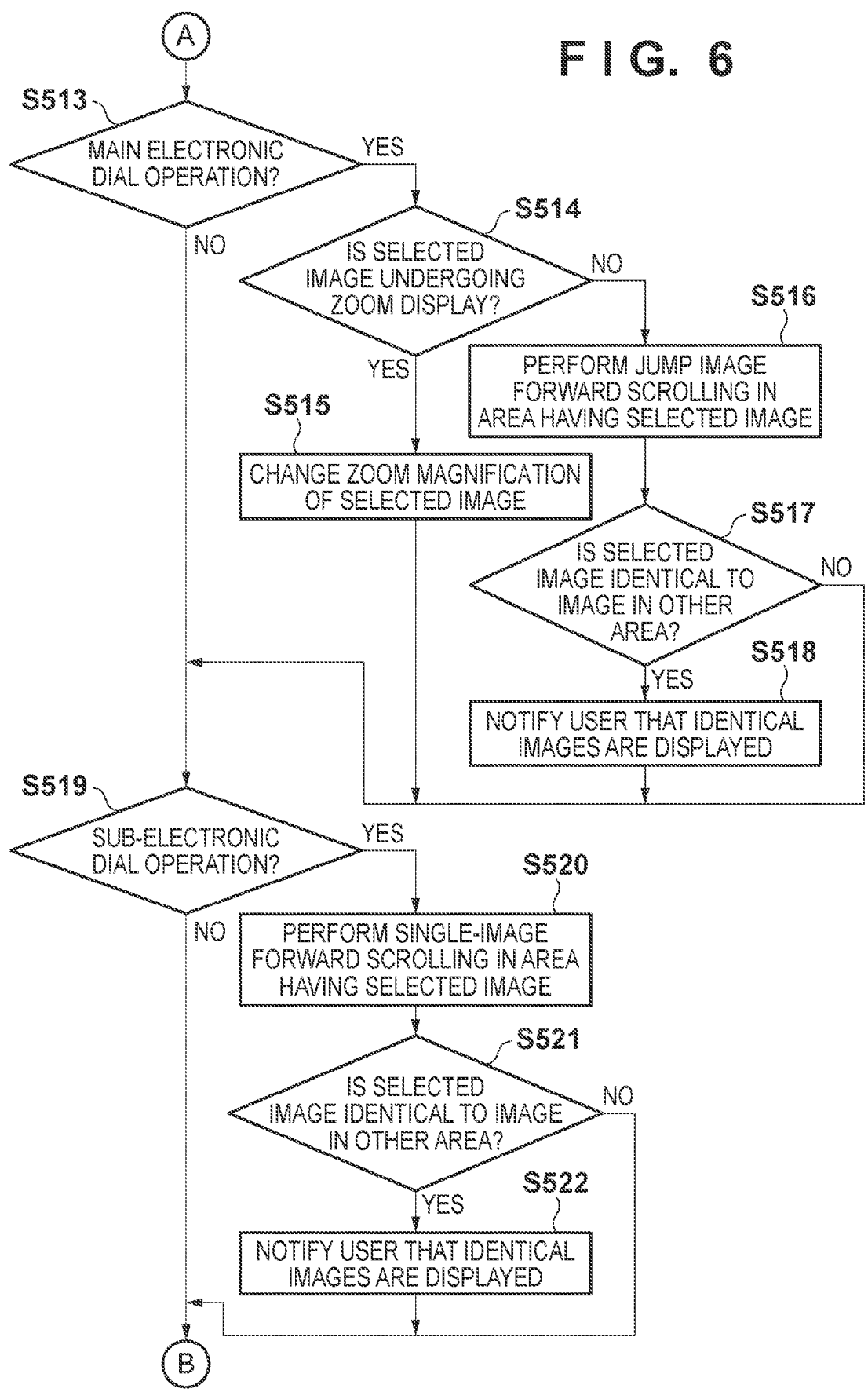
FIG. 6 is a flowchart showing the two-image display process in step S411 of FIG. 4.

Referring to FIG. 5, in step S501, the microcomputer 140 displays an initial display screen in the two-image display mode on the liquid crystal display unit 125. On the initial display screen, the current image before a shift to the two-image display mode is displayed in the left area 310 on the liquid crystal display unit 125 while it is surrounded by the selection frame 301. Also, an image subsequent to the current image in the sorting order of images to undergo image forward scrolling (for example, the order of file numbers) is displayed in the right area 320. As a result, a display screen is displayed as shown in FIG. 3A (when the current image before a shift to the two-image display mode has file number 0001). Note that an image, which is surrounded by the selection frame 301, of two images displayed in the two-image display mode will be referred to as a selected image hereinafter.

In step S502, the microcomputer 140 determines whether the SET button 212 is operated. If Yes is determined in step S502, the process advances to step S503; otherwise, the process directly advances to step S504.

In step S503, the microcomputer 140 performs a process of changing the selected image. If the image in the left area 310 is selected before the SET button 212 is operated, the selected image is changed to the image in the right area 320. If the image in the right area 320 is selected before the SET button 212 is operated, the selected image is changed to the image in the left area 310. With this change, the selection frame 301 is moved to the selected image.

Figure 3F:
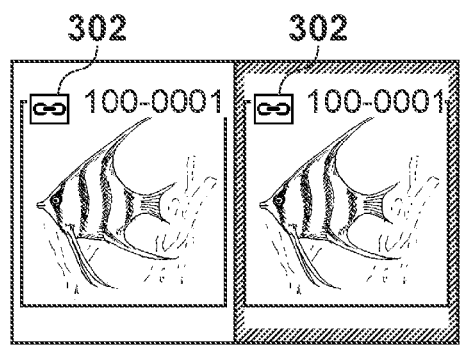
Figure 3C:
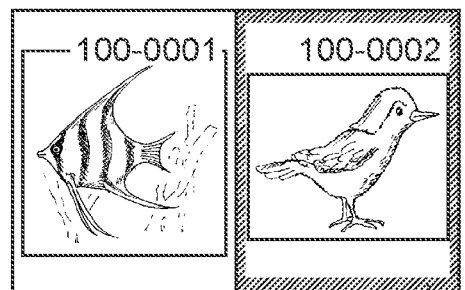

For example, when the display screen is displayed as shown in FIG. 3A before the SET button 212 is operated, the selected image is changed in response to the operation of the SET button 212 to display the display screen as shown in FIG. 3C.

In step S504, the microcomputer 140 determines whether the zoom button 208 is operated. If Yes is determined in step S504, the process advances to step S505; otherwise, the process directly advances to step S508.

In step S505, the microcomputer 140 determines whether the selected image is undergoing zoom display (whether the zoom mode is set). If No is determined in step S505, the process advances to step S506; otherwise, the process advances to step S507.

In step S506, the microcomputer 140 zooms and displays the selected image at a specific zoom magnification. Note that the zoom magnification is registered on, for example, the menu display screen by the user in advance. For example, when the selected image is displayed in the right area 320, the display screen displayed on the liquid crystal display unit 125 changes from that shown in FIG. 3C to that shown in FIG. 3D upon the operation of the zoom button 208.

In step S507, the microcomputer 140 cancels the zoom of the selected image. Upon this operation, when, for example, the selected image is displayed in the right area 320, the display screen displayed on the liquid crystal display unit 125 changes from that shown in FIG. 3D to that shown in FIG. 3C upon the operation of the zoom button 208.

In step S508, the microcomputer 140 determines whether the zoom/apply button 206 is operated. If Yes is determined in step S508, the process advances to step S509; otherwise, the process directly advances to step S510.

In step S509, the microcomputer 140 applies the zoom magnification and zoom position of the selected image to the other image as well (the zoom magnification and zoom position of the other image are set equal to those of the selected image). The zoom position is determined based on the magnification of the zoom position to the horizontal and vertical dimensions of the entire image. Therefore, the present invention is applicable even if the selected image and the other image have different aspect ratios. When the selected image is displayed in the right area 320, the display screen displayed on the liquid crystal display unit 125 changes from that shown in FIG. 3D to that shown in FIG. 3E upon the operation of the zoom/apply button 206.

In step S510, the microcomputer 140 determines whether the reproduction button 209 is operated. If Yes is determined in step S510, the process advances to step S511; otherwise, the process directly advances to step S513.

Figure 3G:
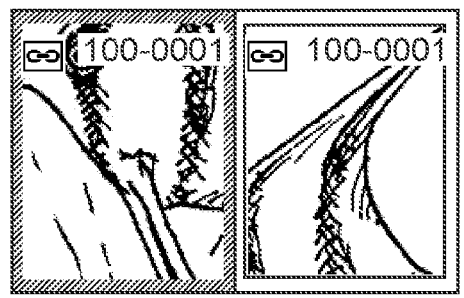
Figure 3D:
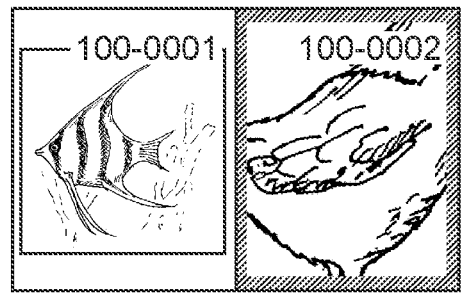
Figure 3H:
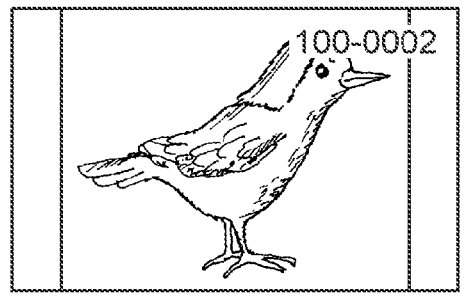

In step S511, the microcomputer 140 displays the entire display screen at unit magnification in the entire display area on the liquid crystal display unit 125, regardless of whether the selected image is undergoing zoom display. For example, when the selected image has file number 0002, a display screen as shown in FIG. 3H is displayed regardless of whether the selected image is present in the left area 310 or the right area 320. Upon this operation, if the selected image is not kept zoomed, it is displayed using the entire display area on the liquid crystal display unit 125, thereby allowing the user to confirm it in the form of a large image with a high resolution. On the other hand, if the selected image is kept zoomed, its entire feature can hardly be discriminated based only on the zoomed portion but can be confirmed quickly upon the operation of the reproduction button 209. That is, it is suitable to display a display screen as shown in FIG. 3H both during or not during zoom display while display is done in the two-image display mode.

In step S512, the microcomputer 140 determines whether the operation of the reproduction button 209 is canceled (the reproduction button 209 is released). If No is determined in step S512, the process waits until the operation of the reproduction button 209 is canceled. Upon the cancel, the display state is returned to that before the operation of the reproduction button 209. In this manner, display which uses the entire display area in step S511 is performed only in the duration of the operation of the reproduction button 209. This allows the user to confirm the entire selected image during display in the two-image display mode, based on the image displayed in step S511, and then quickly return the display state to the original display state to continue the operation. Also, this function is assigned to the reproduction button 209 placed on the side opposite to the grip side on which the main electronic dial 202, sub-electronic dial 203, and SET button 212 are arranged in the camera main body. That is, the reproduction button 209 is placed on the side opposite to the grip side on which the main electronic dial 202 for jump image forward scrolling, the sub-electronic dial 203 for single-image forward scrolling, and the SET button 212 for switching the selected image are arranged. Hence, the user can display the image in step S511 with his or her left hand without changing the position of his or her right hand during the operation of switching the selected image by operating the main electronic dial 202, sub-electronic dial 203, and SET button 212 with his or her right hand gripping the grip portion. That is, the user can quickly, efficiently switch and confirm a large number of images with both of his or her hands.

Referring again to FIG. 6, in step S513, the microcomputer 140 determines whether the main electronic dial 202 is operated. If Yes is determined in step S513, the process advances to step S514; otherwise, the process directly advances to step S519.

In step S514, the microcomputer 140 determines whether the selected image is undergoing zoom display. If Yes is determined in step S514, the process advances to step S515, in which the zoom magnification in zoom display of the selected image is changed in accordance with the amount of operation of the main electronic dial 202. If No is determined in step S514, the process advances to step S516, in which jump image forward scrolling corresponding to the amount of operation of the main electronic dial 202 is performed in the area having the selected image, of the left area 310 and right area 320. The jump image forward scrolling in step S516 is the same as that in step S405 described above. Note that when the selected image undergoes zoom display before image forward scrolling, the same zoom magnification and zoom position are applied to an image after image forward scrolling as well, so image forward scrolling is performed for the zoomed image. The image in the other area remains unchanged independently of this operation.

In step S517, the microcomputer 140 determines whether an image newly displayed in the currently selected area is identical to that originally displayed in the other area, based on the result of jump image forward scrolling in step S516. This determination can be done by, for example, comparing whether these two images have the same file number. If Yes is determined in step S517, the process advances to step S518; otherwise, the process directly advances to step S519.

In step S518, the microcomputer 140 notifies the user of a message which prompts him or her to identify that the image displayed in the left area 310 and that displayed in the right area 320 are contained in the same file. In this embodiment, as this notification, image identity icons 302 indicating that the image displayed in the left area 310 and that displayed in the right area 320 are contained in the same file are displayed in the two areas. FIGS. 3F and 3G illustrate display examples of the image identity icons 302. As shown in FIG. 3F, if images having file number 0001 are displayed in both the left area 310 and right area 320, the image identity icons 302 are displayed in the two areas. Upon the display of the image identity icons 302, the user can easily identify that the images currently displayed in the two areas are identical even if images that can hardly be identified as identical, such as continuous shot images, are confirmed. Also, because the entire image is displayed without zooming the image in FIG. 3F, it may be possible to identify whether the two images are identical simply by looking at them without using the image identity icons 302. However, it is more difficult to determine whether the two images are identical simply by looking at them when zoom display is done. Referring to FIG. 3G, different portions of images in the same file are undergoing zoom display in the two areas. In this case, the images displayed in the two areas are contained in the same file but nonetheless different portions are displayed and visible. Hence, it is difficult to identify whether the two images are identical simply by looking at them once.

According to this embodiment, even in such a case, when images in the same file are displayed in the two areas, the image identity icons 302 are displayed in these areas, so the user can reliably identify that identical images are currently displayed in the two areas. This makes it possible to prevent the user from misinterpreting identical images displayed in the two areas as two similar images and deleting them.

In step S519, the microcomputer 140 determines whether the sub-electronic dial 203 is operated. If Yes is determined in step S519, the process advances to step S520; otherwise, the process directly advances to step S523.

In step S520, the microcomputer 140 performs single-image forward scrolling in the area having the selected image. Note that when the selected image undergoes zoom display before image forward scrolling, the same zoom magnification and zoom position are applied to an image after image forward scrolling as well, so image forward scrolling is performed for the zoomed image. The image in the other area remains unchanged independently of this operation. The single-image forward scrolling in step S520 is the same as that in step S407 described above.

In step S521, the microcomputer 140 determines whether an image newly displayed in the currently selected area is identical to that originally displayed in the other area, based on the result of single-image forward scrolling in step S520. This determination can be done by, for example, comparing whether these two images have the same file number. If Yes is determined in step S521, the process advances to step S522; otherwise, the process directly advances to step S523. The process in step S522 is the same as that in step S518 described earlier, and a description thereof will not be given.

Figure 7:
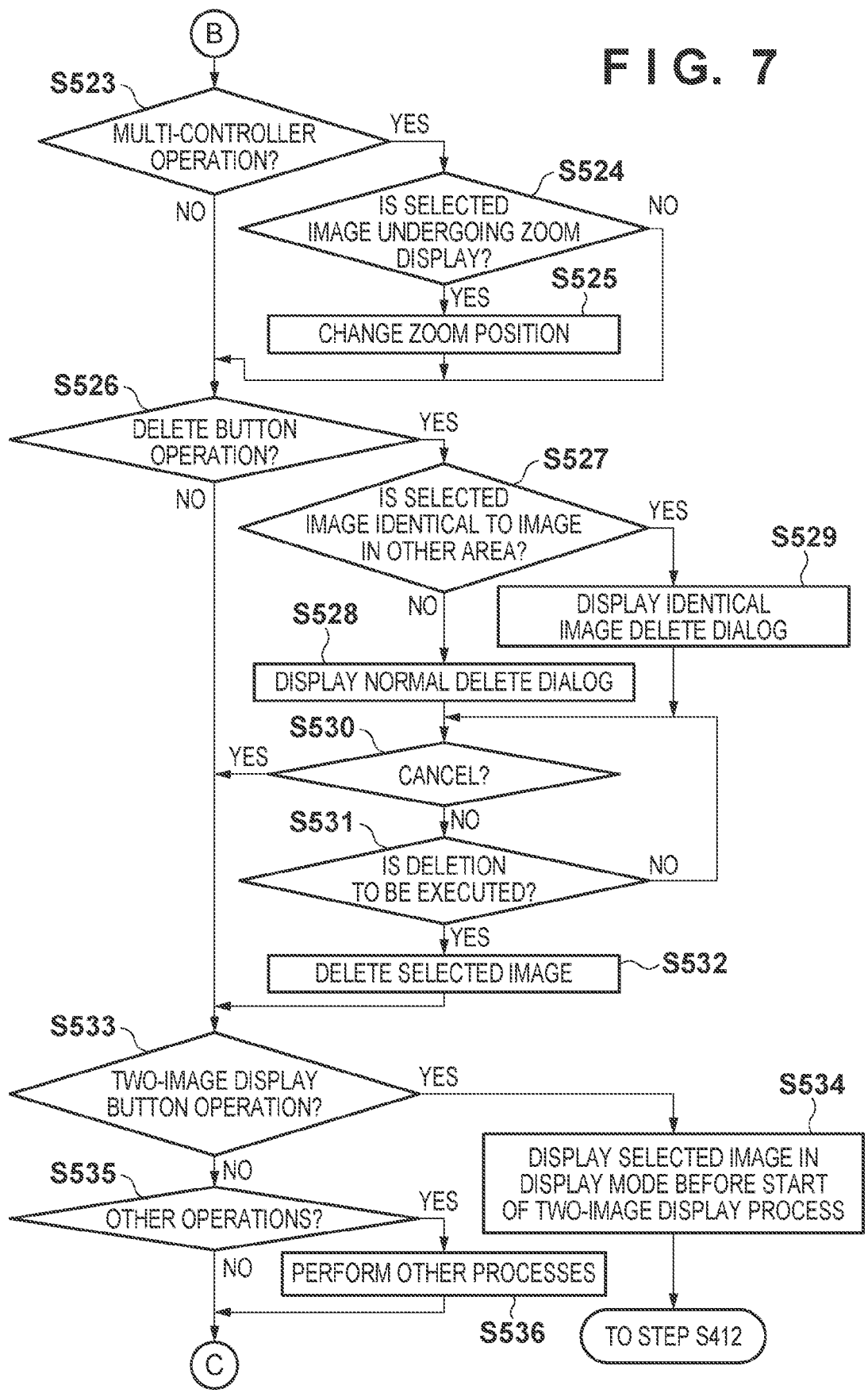
FIG. 7 is a flowchart showing the two-image display process in step S411 of FIG. 4.

Referring to FIG. 7, in step S523, the microcomputer 140 determines whether the multi controller 211 is operated. If Yes is determined in step S523, the process advances to step S524; otherwise, the process directly advances to step S526.

In step S524, the microcomputer 140 determines whether the selected image is undergoing zoom display. If Yes is determined in step S524, the process advances to step S525, in which the zoom position is changed in response to the operation of the multi-controller 211.

In step S526, the microcomputer 140 determines whether the delete button 207 is operated. If Yes is determined in step S526, the process advances to step S527; otherwise, the process directly advances to step S533.

In step S527, the microcomputer 140 determines whether the selected image is an image in the same file as that currently displayed in the other area. That is, the microcomputer 140 determines whether images in the same file are currently displayed in the two areas. If No is determined (images in different image files are currently displayed), the process directly advances to step S528; otherwise, the process advances to step S529.

Figure 8A:
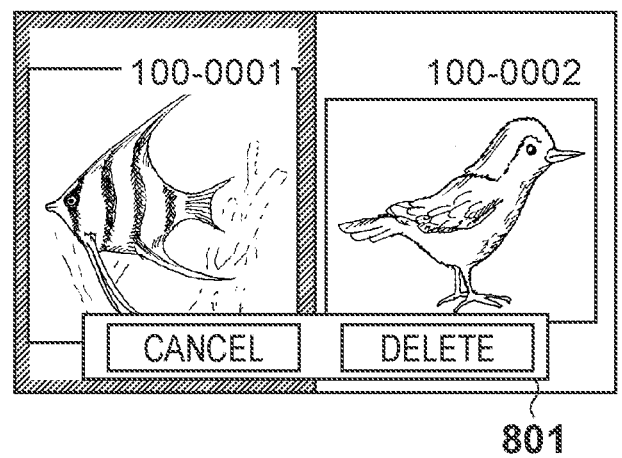
FIGS. 8A to 8C are views illustrating delete dialogs displayed in the two-image display process.

In step S528, the microcomputer 140 displays a normal delete dialog in the image display area. FIG. 8A illustrates a display example of the normal delete dialog. Options for selecting whether deletion is to be executed or canceled are displayed on a delete dialog 801.

Figure 8B:
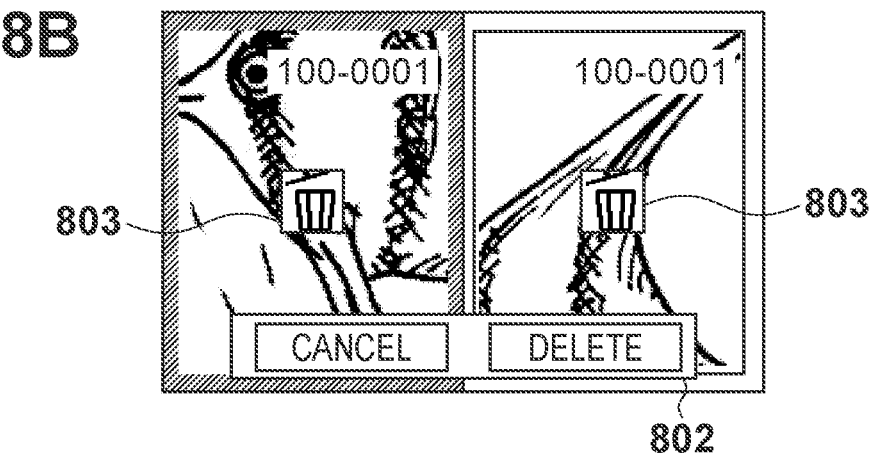

In step S529, the microcomputer 140 displays an identical image delete dialog in the image display area. FIG. 8B illustrates a display example of the identical image delete dialog. In displaying an identical image delete dialog 802, not only options for selecting whether deletion is to be executed or canceled but also deletion confirmation icons 803 are displayed in both the left area 310 and right area 320. Upon such display, the user can identify that the images currently displayed in the two areas are contained in the same file, so the image displayed in the other area is deleted when the selected image is deleted. Upon this operation, when the images displayed in the two areas are contained in the same file, the user can be prevented from misinterpreting that the image in the other area is not deleted even when the selected image is deleted, deleting the selected image, and unintentionally losing a desired image.

In step S530, the microcomputer 140 determines whether cancel is selected and determined via the normal delete dialog 801 or identical image delete dialog 802. If Yes is determined in step S530, the delete dialog is deleted, and the process directly advances to step S533. If No is determined in step S530, the process advances to step S531, in which the microcomputer 140 determines whether deletion execution is selected and determined. If No is determined in step S531, the process waits until deletion execution or cancel is selected and determined. When deletion execution is selected and determined, the process advances to step S532, in which the image file of the selected image is deleted from the recording medium 128.

In step S533, the microcomputer 140 determines whether the two-image display button 205 is operated. If Yes is determined in step S533, the process advances to step S534; otherwise, the process advances to step S535.

In step S534, the microcomputer 140 displays the selected image in the display mode (single-display or multi-display) before the start of the two-image display process. The microcomputer 140 displays the selected image on the entire display screen if this display mode is single-display, or displays a plurality of images including the selected image on one display screen while the selected image is surrounded by the selection frame if this display mode is multi-display. After the process operation in step S534 ends, the process returns to step S412 in FIG. 4 mentioned above.

In step S535, the microcomputer 140 determines whether other operations are performed. Examples of the other operations include an operation of assigning a protect attribute or an evaluation value attribute indicating the user's favorite level to the selected image, an operation of displaying a menu display screen to change various settings, and an operation of switching the item or mode of information display associated with the displayed image. If Yes is determined in step S535, the process advances to step S536, in which the microcomputer 140 performs processes corresponding to the other operations; otherwise, the process directly returns to step S501, in which a series of processes is repeated.

Note that the notification for prompting the user to identify that the image displayed in the left area 310 and that displayed in the right area 320 are contained in the same file in steps S518 and S522 is not limited to the above-mentioned example. For example, this notification may be done by changing the color or background of the selection frame surrounding the selected image in accordance with whether the image displayed in the left area 310 and that displayed in the right area 320 are contained in the same file or different files. Also, this notification may be done by surrounding only the selected image using the selection frame if the image displayed in the left area 310 and that displayed in the right area 320 are contained in different files, or simultaneously surrounding the images in the two areas using the selection frame if these images are contained in the same file. Moreover, this notification may be done by generating, for example, an alarm. For example, a sound output as an operation confirmation sound in image forward scrolling in the area having the selected image is changed in accordance with whether image forward scrolling is performed for an image different from the other image or that contained in the same file.

Again, the above-mentioned notification may be done by changing the display mode so that displayed file numbers 311 and 321 are highlighted if the two images are contained in different files or blinked if they are contained in the same file. By presenting file identifiers such as file numbers 311 and 321 to the user, the user can be more reliably notified that images in the same file are displayed. If the two images are contained in different files, file identifies may be displayed only if the two images are contained in the same file without displaying file identifies such as file numbers if they are contained in different files.

As described above, it is more difficult to identify whether the images displayed in both the left area 310 and right area 320 are contained in the same file during zoom display than not during zoom display. Hence, a notification for prompting the user to identify that the image displayed in the left area 310 and that displayed in the right area 320 are contained in the same file may be done only during zoom display. Alternatively, a notification which allows the user to more easily identify that the image displayed in the left area 310 and that displayed in the right area 320 are contained in the same file during zoom display may be done by changing the display mode in accordance with whether a notification is done during or not during zoom display.

Also, it is more difficult to identify whether the images displayed in both the left area 310 and right area 320 are contained in the same file when a plurality of images with little change in composition, such as continuous shot images or images shot by bracket shooting, are compared. Therefore, a notification that the images displayed in both the left area 310 and right area 320 are identical may be done only in a display mode in which continuous shot images or a set of images shot by bracket shooting, and this notification may not particularly be done in other display modes.

Figure 8C:
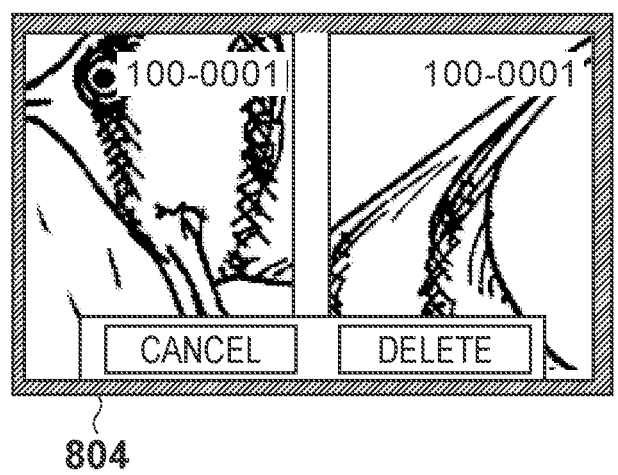

The display mode in an identical image delete dialog is not limited to the above-mentioned example, either. The above-mentioned notification may be done by changing the color or background of the selection frame surrounding the selected image in accordance with whether the two images are contained in the same file or different files. Also, the above-mentioned notification may be done by surrounding only the selected image using the selection frame if the image displayed in the left area 310 and that displayed in the right area 320 are contained in different files, or simultaneously surrounding the images in the two areas using the selection frame if these images are contained in the same file. For example, when a frame 804 which simultaneously surrounds the images in the two areas, as shown in FIG. 8C, is displayed, the user can intuitively recognize that the images in the two areas are both deleted when deletion is executed. Moreover, the above-mentioned notification may be done by generating, for example, an alarm.

Figure 9A:
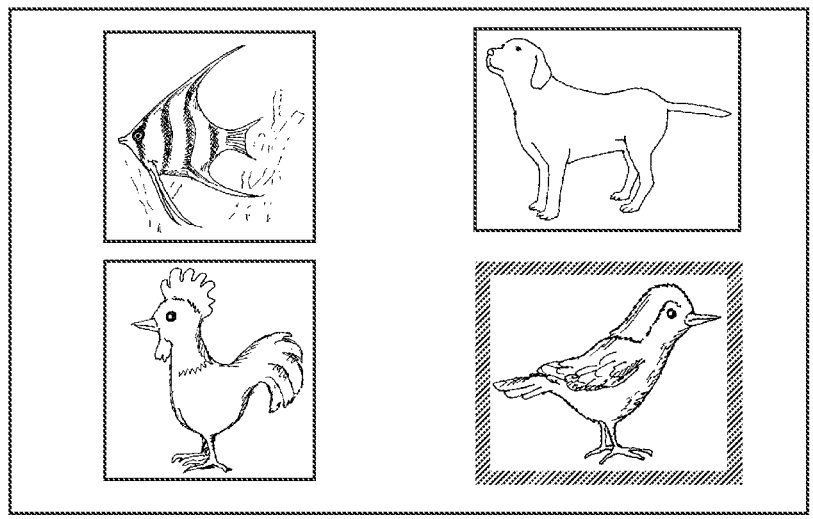
FIGS. 9A and 9B are views illustrating image display modes in a four-image display process.
Figure 9B:
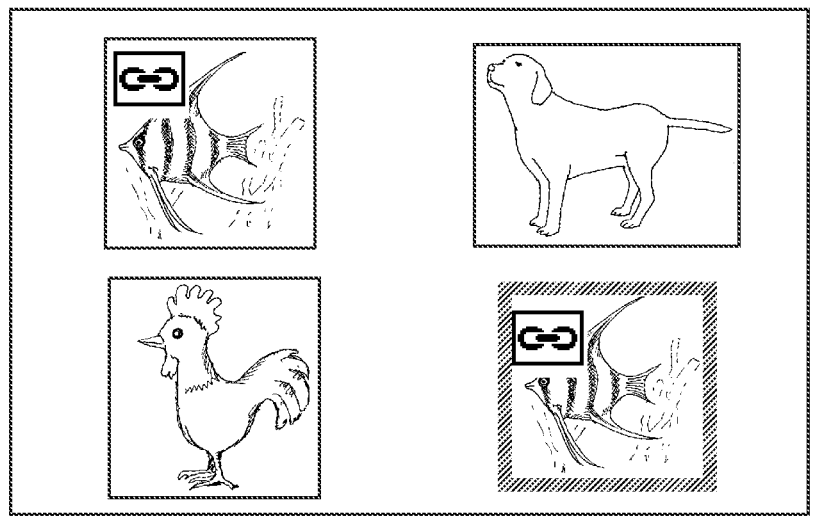

Although the two-image display mode has been taken as an example of the display mode in which image forward scrolling can be independently performed in a plurality of areas, the present invention is not limited to this. That is, the present invention is applicable as long as a display screen on which image forward scrolling can be independently performed in two or more areas and images in the same file can be displayed in a plurality of areas is used. For example, as shown in FIG. 9A, the case wherein in a four-image display mode in which a total of four images are simultaneously displayed in four areas, respectively, image forward scrolling can be independently performed in these areas will be considered. In this case as well, as shown in FIG. 9B, the above-mentioned notification is suitably done by displaying, for example, an image identity icon indicating that the images displayed in a plurality of areas are contained in the same file when identical images are displayed in these areas.

As described above, according to this embodiment, by notifying the user that images displayed in a plurality of areas within the same display screen are identical, he or she can reliably identify that the images displayed in these areas are contained in the same file. This makes it possible to prevent, for example, operation mistakes (for example, unintended deletion) as the user misinterprets that images in different files are displayed in a plurality of areas although the images in the same file are displayed in these areas.

Note that the microcomputer 140 may be controlled by one hardware module, or the entire apparatus may be controlled by sharing processes among a plurality of hardware modules. Also, although the present invention has been described in detail with reference to its embodiments, the present invention is not limited to these specific embodiments, and various modes are incorporated in the present invention without departing from the scope of this invention. Furthermore, each of the above-mentioned embodiments is merely an exemplary embodiment of the present invention, and these embodiments may be combined as needed.

Although the case wherein the present invention is applied to a digital camera has been taken as an example in the above-mentioned embodiments, the present invention is not limited to this, and is applicable as long as a display control apparatus capable of controlling to simultaneously display a plurality of images is used. That is, the present invention is applicable to, for example, a personal computer, a PDA, a mobile phone terminal, a mobile image viewer, a printer apparatus including a display, a digital photo frame, a music player, a game machine, or an electronic book reader.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-152341, filed Jul. 8, 2011, which is hereby incorporated by reference herein in its entirety.

What is claimed is:

1. A display control apparatus comprising:
    a display control unit arranged to display an image in each of a plurality of areas within a display screen, wherein image scrolling can be independently performed in each of the plurality of areas;
    a notifying unit arranged to provide a notification which indicates that the images in two or more of the plurality of areas are from the same file, when the images are from the same file, and not to provide the notification otherwise; and
    a switching unit arranged, when images from the same file are displayed in two or more of the plurality of areas, to switch one of the images displayed in at least one of the plurality of areas to another image,
    wherein, after the switching unit switches one of the images displayed in at least one of the plurality of areas to another image, the notifying unit provides a notification which indicates that the images in two or more of the plurality of areas are from the same file, when the images are from the same file, and does not provide the notification otherwise.

2. The apparatus according to claim 1, further comprising a processing unit configured to apply a predetermined process to the images displayed by said display control unit, in response to an operation by a user.

3. The apparatus according to claim 2, wherein the predetermined process includes a process of deleting a file containing the displayed image from a recording medium.

4. The apparatus according to claim 2, wherein when images from the same file are displayed in two or more of the plurality of areas, and the operation by the user is an operation to apply the predetermined process to the image displayed in one of the two or more areas, said notifying unit is arranged to display an icon, indicating that the predetermined process is to be applied, in the other area as well.

5. The apparatus according to claim 2, wherein when the operation by the user is an operation of deleting the image displayed in one of the plurality of areas, said notifying unit is arranged to display a dialog box to notify the user that the image displayed in the other area is simultaneously deleted because the image displayed in the one area and the image displayed in the other area are from the same file.

6. The apparatus according to claim 1, further comprising a zoom display unit configured to perform, in at least one of the plurality of areas, zoom display of the image displayed in the at least one of the plurality of areas.

7. The apparatus according to claim 6, wherein in the area in which the image having undergone the zoom display is displayed, when the displayed image is switched to the other image, said zoom display unit is arranged to control zoom display by applying a zoom magnification and a zoom position applied to the image having undergone the zoom display before switching to an image and after switching to an image.

8. The apparatus according to claim 1, wherein said display control unit includes a two-image display mode in which an image is displayed in each of two areas within the display screen, and a four-image display mode in which an image is displayed in each of four areas within the display screen.

9. The apparatus according to claim 1, wherein said notifying unit is arranged to display an icon, indicating that images from the same file are displayed in two or more of the plurality of areas, the icon being displayed in each of the plurality of areas in which the images are displayed.

10. The apparatus according to claim 1, further comprising a determination unit arranged to compare file names of the images displayed in the plurality of areas within the display screen to determine whether the images displayed in the plurality of areas are from the same file.

11. The apparatus according to claim 1, wherein the display control apparatus includes an image capturing apparatus comprising an image sensing unit, and said display control unit is arranged to display said images on a display screen provided on a back surface of said image capturing apparatus.

12. The apparatus according to claim 1, wherein the same file is the same physical file.

13. A display control method comprising:
a display control step of displaying an image in each of a plurality of areas within a display screen, wherein image scrolling can be independently performed in each of the plurality of areas;
a first notifying step of providing a notification which indicates that the images in two or more of said plurality of areas are from the same file, when the images are from the same file, and not providing the notification otherwise;
a switching step of, when images from the same file are displayed in two or more of the plurality of areas, switching one of the images displayed in at least one of the plurality of areas to another image; and
a second notifying step of, after switching in the switching step one of the images displayed in at least one of the plurality of areas to another image, providing a notification which indicates that the images in two or more of the plurality of areas are from the same file, when the images are from the same file, and not providing the notification otherwise.

14. A non-transitory computer-readable storage medium storing a program for causing a computer to execute the control method according to claim 13.

* * * * *